(12) United States Patent
Liu et al.

(10) Patent No.: US 10,031,994 B1
(45) Date of Patent: Jul. 24, 2018

(54) SYSTEMS AND METHODS FOR CONGESTION AND ROUTABILITY AWARE DETAILED PLACEMENT

(71) Applicant: CADENCE DESIGN SYSTEMS, INC., San Jose, CA (US)

(72) Inventors: Wen Hao Liu, Cedar Park, TX (US); Jhih-Rong Gao, Austin, TX (US); Mehmet Yildiz, Austin, TX (US); Charles Alpert, Cedar Park, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 84 days.

(21) Appl. No.: 15/219,008

(22) Filed: Jul. 25, 2016

(51) Int. Cl.
 *G06F 17/50* (2006.01)
(52) U.S. Cl.
 CPC ...... *G06F 17/5072* (2013.01); *G06F 17/5077* (2013.01)
(58) Field of Classification Search
 CPC ............ G06F 17/5045; G06F 17/5068; G06F 17/5072; G06F 17/5077; G06F 17/5081
 USPC ................................................ 716/119, 126
 See application file for complete search history.

(56) References Cited

U.S. PATENT DOCUMENTS

| | | | | |
|---|---|---|---|---|
| 7,895,549 | B1 * | 2/2011 | Perry ................... | G06F 17/505 716/100 |
| 2005/0262465 | A1 * | 11/2005 | Goyal .................. | G06F 17/505 716/104 |
| 2007/0186205 | A1 * | 8/2007 | Yu ....................... | G06F 17/5045 716/102 |
| 2009/0031269 | A1 * | 1/2009 | Chen ................... | G06F 17/5072 716/119 |
| 2014/0189623 | A1 * | 7/2014 | Chen ................... | G06F 17/5009 716/107 |

\* cited by examiner

*Primary Examiner* — Paul Dinh
(74) *Attorney, Agent, or Firm* — Eric L. Sophir; Dentons US LLP

(57) ABSTRACT

Disclosed herein are systems and methods to reduce wirelength and congestion in an integrated circuit (IC) design. The systems and methods disclosed herein may be implemented during a detailed placement stage of IC design to identify and select a cell for relocation and determine an area of interest to which the cell can be relocated. The systems and methods may identify one or more potential locations within the area of interest where the cell can be relocated to, and then determine a cost based upon the wirelength and/or congestion for the selected cell, at each of the one or more potential locations. Upon determining that a potential location may have a lower cost compared to the original location of the selected cell, the systems and methods may relocate the selected cell to the potential location.

18 Claims, 14 Drawing Sheets

| 24 | 21 | 22 | 31 | 42 | 45 |
| --- | --- | --- | --- | --- | --- |
| 21 | 18 | 19 | 29 | 30 | 33 |
| 20 | 17 | 18 | 28 | 29 | 32 |
| 19 | 16 | 17 | 29 | 28 | 31 |
| 18 | 15 | 16 | 26 | 27 | 30 |
| 12 | 9 | 10 | 11 | 12 | 15 |

400f

407

Lowest-cost location

*FIG. 4F*

SYSTEMS AND METHODS FOR CONGESTION AND ROUTABILITY AWARE DETAILED PLACEMENT

TECHNICAL FIELD

This application relates generally to the field of optimizing electronic circuit designs; and more specifically systems, methods, and products to reduce congestion and wirelength in an integrated circuit (IC).

BACKGROUND

A semiconductor IC has a large number of circuit devices with complex interconnections. The placement of the circuit devices and the routing of the interconnections between the circuit devices of the IC may be facilitated with an Electronic Design Automation (EDA) tool, which allows an enormous flexibility in design and optimization of the IC. EDA technologies typically run on an operating system in conjunction with a microprocessor-based computer system or other programmable control system.

The placement and routing of the circuit devices presents unique design challenges. Placing the circuit devices at relatively greater distances from each other, or "under-packing," may waste wirelength, as longer wires have to be used to interconnect the circuit devices at greater distances from one another. The longer wires consume higher dynamic power to carry the signals, compared to shorter wires that consume less power. Furthermore, longer wires may have a higher resistance, and therefore, a higher voltage has to used for signal transmission. In addition, packing the circuit devices loosely may also increase the footprint of the circuit to allow for the greater distances between the circuit distances.

On the other hand, placing the circuit devices closer together, or "over-packing," may increase congestion in the circuit. For the closely packed circuit devices, a large number of interconnecting wires may have to be fitted in smaller routing channels. The number of wires in the routing channels may be limited by physical constraints, such as keeping the wires at a certain distance to not cause a short. Over-packing may cause overloading of the routing channels and may cause congestion.

What is therefore needed is a system that can reduce the wirelength of the IC by packing the circuit devices closer together but also avoids congestion. In other words, what is needed is a system that can determine optimal placement and routing of circuit devices which reduces wirelength and congestion at the same time.

SUMMARY

Methods and systems disclosed herein address the issues of wirelength and congestion and may further provide a number of other benefits as well. Method and systems of electronic circuit design and optimization disclosed herein result in an improved, power efficient IC with reduced wirelength and reduced congestion.

In one embodiment, a computer-implemented circuit design method comprises receiving, by a computer, a netlist file comprising a plurality of records of a plurality of circuit devices and a plurality of nets interconnecting the plurality of circuit devices forming an integrated circuit (IC), wherein each respective record of a circuit device or a net indicates a location of the circuit device or the net; identifying, by the computer, a potential second location for a first circuit device at a first location, based upon one or more records of at least one of a circuit device and a net indicating the circuit device or the net has a location proximate to the first location of the first circuit device as indicated by a record of the first device; determining, by the computer, for a first net connected to the first circuit device at the second location, a wirelength value and a congestion value associated with the first net; determining, by the computer, a cost associated with the first net based upon the wirelength value and the congestion value; determining, by the computer, a composite cost for the first circuit device at the second location based upon one or more costs associated with one or more nets including the first net connected to the first circuit device at the second location; and in response to the computer determining that, for the first circuit device, the second location has a lower composite cost than the first location: updating, by the computer, location information in the record of the first circuit device in the netlist file, from the first location to the second location, whereby the respective routing cost of at least a portion of the IC decreases responsive to updating the location information.

In another embodiment, a system for circuit design, the system comprises one or more computers comprising a non-transitory machine-readable media configured to store a netlist file comprising a plurality of records of a plurality of circuit devices and a plurality of nets interconnecting the plurality of circuit devices forming an integrated circuit (IC), wherein each respective record of a circuit device or a net includes at least a location of the circuit device or the net; and at least one computer of the one or more computers, the at least one computer coupled to the non-transitory machine readable media storing the netlist file and comprising a processor configured to: identify a potential second location for a first circuit device at a first location, based upon one or more records of at least one of a circuit device and a net proximate to the first location as indicated by a record of the first circuit device; determine, for a first net connected to the first circuit device at the second location, a wirelength value and a congestion value associated with the first net; determine a cost associated with the first net based upon the wirelength value and the congestion value; determine a composite cost for the first circuit device at the second location based upon one or more costs associated with one or more nets including the first net connected to the first device at the second location; and in response to the computer determining that, for the first circuit device, the second location has a lower composite cost than the first location: update location information in the record of the first circuit device in the netlist file, from the first location to the second location, whereby respective routing cost of at least a portion of the IC decreases responsive to updating the location information.

BRIEF DESCRIPTION OF THE DRAWINGS

The accompanying drawings constitute a part of this specification and illustrate embodiments of the subject matter disclosed herein.

FIG. 4F is a schematic diagram showing a circuit routing map rendering the composite routing cost of placing the candidate cell at each of the bins within the second bounding box.

DETAILED DESCRIPTION

Figure 1:
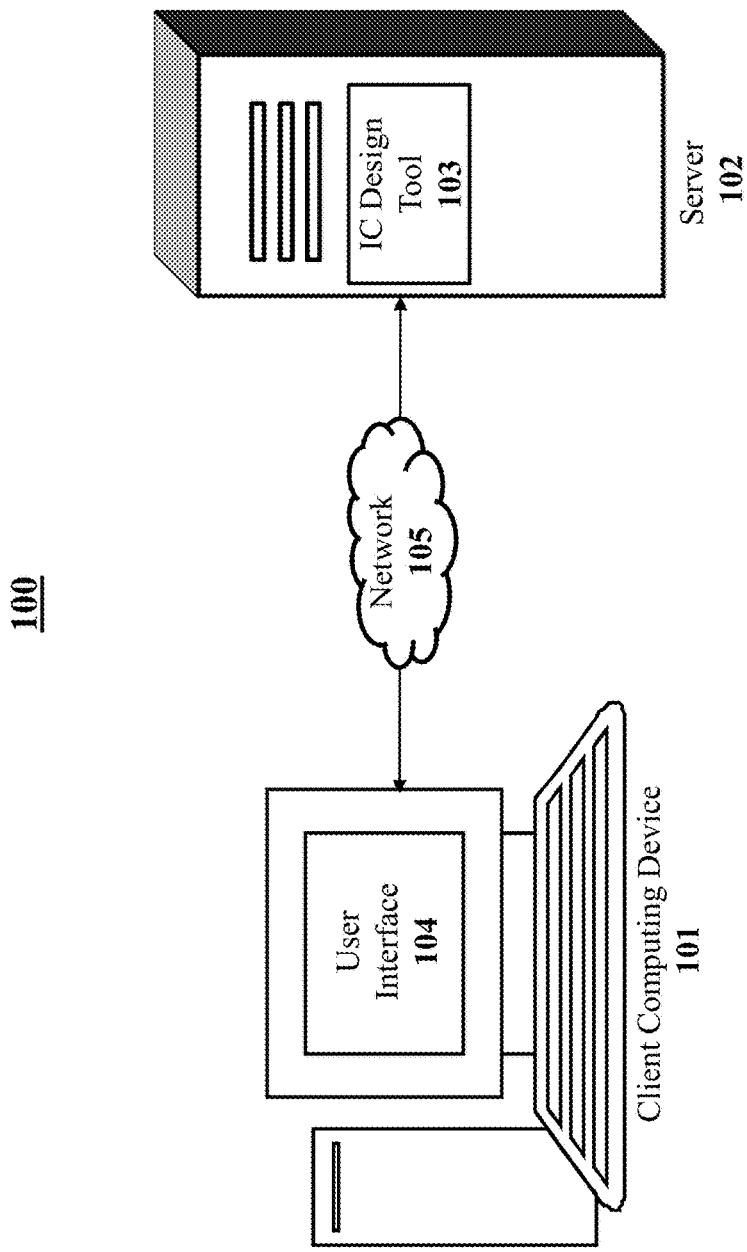
FIG. 1 is a schematic diagram illustrating a system, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein include systems and methods for congestion-aware and routability-aware detailed placement of circuit devices. The embodiments of the present disclosure may be implemented in electronic design automated (EDA) technologies, such as a custom Integrated Circuit (IC) design system having a graphical user interface or layout editor running program code to assist a circuit designer to generate, implement, and optimize customized electronic circuit design. Although the present disclosure can be implemented to run with custom design systems, it is understood that the present disclosure is not limited thereto and may also be implemented with other known or later developed EDA technologies or hardware description languages capable of generating and manipulating various circuit devices to generate and optimize electronic layout.

The EDA layout software and computing devices may access a design database hosted on one or more computing devices configured store records of the design elements of the IC. The design database may enforce a standard data record format, such as an OpenAccess (OA) database, allowing for interoperability support between disparate electronic design software tools. The EDA layout software and associated database may generate, store, and/or reformat data according to any number of proprietary and/or standardized formats and protocols. The EDA layout software may include tools (e.g., executable routines, associated software programs) configured to synthesize hardware description language, such as VHDL and Verilog, to generate a netlist file representing a netlist of a circuit, or a set of data records representing a netlist of a circuit.

Typically, ICs and IC design and layout tools may follow a standard cell-based design approach. A standard cell (or simply a "cell") may include a circuit comprising one or more transistors that function as a combination logic device, such as an AND, OR, NOR, NAND, XOR gate, or a storage device, such as a latch or a flip-flop. In addition or in the alternative, a cell may include one or more combination logic devices and/or one or more sequential logic devices defining circuit devices such as an adder or a shifter. Millions, if not billions, of cells are placed and interconnected on a semiconductor die to create an IC. For ease of explanation and illustration, this disclosure describes the various embodiments of detailed placement and routing in terms of the standard cells. However, it should not be construed that these embodiments apply only to the standard cell-based design. One having ordinary skill in the art would appreciate that the embodiments described herein may apply equally to most any transistor-level design and manufacture tools, or any design or manufacture tools that implement and manipulate circuit devices of an IC, such as AND gates, OR gates, NOR gates, NAND gates, XOR gates, flip-flops, and latches.

During the placement and/or routing stages of an IC design, an IC design tool may generate multiple routing tracks as placement locations for the wires interconnecting the cells. The position and/or the dimensions, such as width and length, of a routing track, such as width and length of the routing track, is based upon multiple factors, such as which metal layer of the circuit the routing track is located on, macro-blockages, manufacturing limitations, and/or other user defined adjustments or parameters. The routing tracks are generally located on metal layers above the cells. A set of one of more routing tracks may define a routing channel, wherein a single interconnecting wire may occupy a single routing track. The wires connecting the cells may follow complex routing rules based on various physical and/or logical constraints and may pass through a plurality of channels. Furthermore, the wires may further span across multiple metal layers in the IC.

A channel may be said to have "congestion" when a threshold percentage of the tracks in the channel are occupied. For example, an IC design tool may indicate that a channel is congested when 80% of the tracks in the channel have been occupied by the interconnecting wires. In some instances, the IC design tool may indicate that the channel is congested when 100% of the tracks in the channel have been occupied by the interconnecting wires. The threshold percentage may be specific to a portion of the IC design and different portions of the IC design may have different thresholds. It should also be understood by one ordinarily skilled in the art that in addition or in the alternative to the phrase "congested areas/channels" and the variants thereof, the phrases "areas/channels with/having high congestion," "high congestion areas/channels," "highly congested areas/channels," or the variants thereof may be used as well. To distinguish from such areas, the phrases "areas/channels with low congestion," "low congestion areas/channels," or the variants thereof may be used. For example, the IC design tool may indicate that a channel has a high congestion when more than 80% of tracks in the channel have been occupied by the interconnecting wires. In contrast, the IC design tool may indicated that a channel has a low congestion when less than 30% of the tracks in the channel have been occupied by the interconnecting wires.

In some embodiments, the threshold to determine the congestion in a routing channel can be dynamically determined by the system based on the parameters such as the die size, criticality of the circuit configuration proximate to the routing channel, and the routing considerations in the later stages of the design flow.

Database records may store and processors may access and utilize congestion values, which may be numerical representations of the levels of congestion. For instance, a congestion value for a wiring channel may indicate the percentage of or the fraction of tracks in the wiring channel occupied by the interconnecting wires. In other instances, the congestion value may be the percentage or fraction of the tracks that have not been occupied by the interconnecting wires. In some instances, the congestion values may indicate levels of congestion such as "high-congestion" or "low-congestion." It should be understood by one ordinarily skilled in the art that these forms of congestion values are merely exemplary, and other forms of expressing the congestion may be enforced by the designer and various software modules.

The placement stage can be divided at least into a global placement stage and a local placement stage. A global placement may generate a general relative positioning of the cells. For example, the global placement may group a first set of cells at a first location proximate to an edge of the die and a second set of cells at a second location proximate to the central area of the die. The global placement may depend upon the connectivity of the cells, for example, the cells that have immediate interconnections may be kept closer together. Other exemplary parameters for global placement may include clock skew tolerance, various blocks designated by the designer to be unalterable, and the size of the die. The global placement may be tentative and the IC design may be further optimized. For example, the global placement may create areas with over-packing of cells and areas with under-packing of cells. The IC design tool may determine that the cells are over-packed when a distance between the cells is below a threshold value, and may determine that the cells are under-packed when the distance between the cells is above a threshold value. Further optimization can be done by local placement, in which the IC design tool may select a local region and determine an optimal placement of the cells within the local region to reduce the issues of over-packing and under-packing within the local region. It should not however be construed that local placement is necessarily implemented after global placement—local placement can be implemented concurrently with global placement. Furthermore, there may other processes such as legalization that may be implemented with at least one of the global placement and detailed placement. The legalization process may determine if the IC design violates any technological constraints, for example, overlapping of the cells, and may further fix such violations.

Database records may store and processors may access and utilize values indicating the packing of cells. In some embodiments, the values may be numeric and based on percentage of total area occupied by the cells in a given region. For instance, if a region has an area of 10 units and the cells in the region occupy 8 units of area, the region may be said to be 80% full. A lower percentage may indicate a under-packing and a higher percentage may indicate over-packing. It should be understood by one ordinarily skilled in the art that the aforementioned region may have any size and may be located at any area in the die. For example, the region may be the entire die area, or may be a fraction of the die area. In some embodiments, the values may be based upon the distances between the cells. For instance, the values may be a weighted average of the distances between the cells, wherein a higher value indicated under-packing and a lower value indicates over-packing. In other instances, the values may be expressed as a fraction of the threshold distance, for example, a value below one may indicate over-packing and a value above one may indicate under-packing. It should be understood by one ordinarily skilled in the art that these forms of values indicating packing of the cells are merely exemplary, and other forms of indicating the packing of the cells may be enforced by the designer and various software modules.

The routing stage can be divided at least into a global routing stage and a local routing stage. The global routing which may be concurrent with the global placement or may be implemented after the global placement, may route the connections between the plurality of cells. The global routing may be tentative, and the IC design may be further optimized. For example, the global routing may create areas with high congestion. Further optimization can be done by local routing, in which the IC design tool may select a local region that has congestion and determine a more optimal routing within the local region to mitigate such congestion. It should not however be construed that local routing is necessarily implemented after global routing—local routing can be implemented concurrently with global routing.

One of the optimization objectives for an IC design is to reduce the length of the wire connecting the plurality of cells. For reducing the wirelength, the cells may be packed closer together to make the interconnecting wires shorter. Shorter interconnecting wires may consume less dynamic power, and therefore packing cells closely may increase the power efficiency of the IC design. Furthermore, packing the cells closer together may decrease area required for the circuitry. However, packing the standard cells closer together may cause more congestion by increasing the number of wires to be routed through a given area/channel. Moreover, shorter wires connecting closely packed cells may also have a lower amount of flexibility in rerouting, for example, shorter wires may have a fewer alternative routes compared to longer wires, and such lower amount of flexibility may also contribute to the congestion problem. In addition, modern ICs may have more complex routing rules, for example, the interconnecting wires may not be routed from a critical area of a circuit, which may contribute to higher congestion in the areas closer to the critical area of the circuit.

Disclosed herein are embodiments of novel systems and methods to alleviate the congestion problem and at the same time reduces the wirelength. During the detailed placement stage, the IC design tool described herein keeps track of the congestion and wirelength associated with a location of a cell. Keeping track of the congestion and wirelength allows the IC design tool to make accurate and up-to-date routability and placement determinations. The IC design tool may select an area of interest that including one or more locations that the cell can be potentially relocated to decrease congestion and at the same time reduce the wirelength. For every potential relocation location, the IC design tool determines the congestion and wirelength associated with the respective potential relocation location. A routing cost may be generated based upon the congestion and/or wirelength for every potential location. The IC design tool may determine that relocating the cell to one of the potential location may have a lower routing cost and therefore may reduce the congestion and reduce wirelength and update the database records accordingly. In other words, the congestion and wirelength is directly modeled into the detailed placement, and therefore the IC design tool may use the congestion and wirelength information during the detailed placement stage. Therefore, the evaluation of congestion and wirelength and movement of cells may be built into the same design tool and therefore can be implemented concurrently. In other words, the disclosed embodiments allow for a co-optimization for congestion, routability, and wirelength. Furthermore, the embodiments disclosed herein describe an incremental/iterative routing process, which may allow for faster computation times.

Although the exemplary process has been described as being implemented in the detailed placement stage, it should be understood that the IC design tool may implement the exemplary process at any stage of the IC design such as global placement, global routing, and clock-tree synthesis.

FIG. 1 illustrates an electronic design automation system 100, according to an exemplary embodiment. The electronic design automation system 100 may include any number of computing devices; the exemplary embodiment may include a client computing device 101 and a server 102. The client device 101 may be connected to the server 102 via hardware and software components of one or more networks 105. A network 105 may also connect various computing; devices with databases or other components of the system 100. Examples of the network 105 include, but are not limited to, Local Area Network (LAN), Wireless Local Area Network (WLAN), Metropolitan Area Network (MAN), \Vide Area Network (WAN), and the Internet. The communication over the network 105 may be performed in accordance with various communication protocols, such as Transmission Control Protocol and Internet Protocol (TCP/IP) User Datagram Protocol (UDP), and IEEE communication protocols.

A client device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client computing device 101 may be configured to communicate with one or more servers 102 of the system 100 through one or more networks 105, using wired and/or wireless communication capabilities. A user interface may include a graphical user interface (GUI 104) that renders an interactive, graphical representation of an IC design, layout, schematic, or other logical representation of the IC that is being designed and optimized using a design tool 103. The GUI 104 may provide interactive elements, such as graphical representations of IC design elements (e.g., cells), for a user to manipulate the IC design layout. In some embodiments, the GUI 104 may include a text based interface allowing the user to enter manual commands for designing and optimizing the IC.

A server 102 may be accessible to a client 101 via one or more networks 105. The server 102 may be any computing device comprising a processor and other computing hardware configured to execute an IC design tool 103 software module (e.g., EDA design software) that may analyze and optimize an IC design. In operation, using a client device 101 to access a design tool 103 hosted on a server 102 over a network 105, a circuit designer may interact with the IC design tool 103, through a number of input devices of the client device 101, such as by inputting a selection as with a mouse or inputting a request as with a keyboard. The IC design tool 103 may generate any number of graphical interface 104 responses based on the inputs received from the client device 101, and then send the data back to the client device 101 to be rendered on the GUI 104.

The server 102 may execute one or more component software modules of the IC design tool 103 software program, which may be a software program that allows users (e.g., engineers, circuit designers) to design and optimize circuit designs through software modules. The IC design tool 103 may provide users with any number of interactive design GUIs 104 for designing an IC and the various design elements, execute automated optimization processes, and execute automated layout-generation processes. The server 102 may comprise, or may be in networked-communication with, non-transitory machine-readable media configured to store a netlist of IC design elements, which may be a machine-readable computer file or a design database containing one or more records of design elements (e.g., circuit devices) of the IC design. In operation, the IC design tool 103 may analyze and optimize the design elements of the netlist associated with the IC design. Non-limiting examples of circuit devices may include memory devices (e.g., flops), combination logic gates (e.g., AND OR, NOT NOR, NAND, XOR), and multiplexers, among others. For a typical or standard, cell-based electronic design automation system 100, one or more of the circuit devices may be indicated as a cell in the netlist. The netlist may also include records of a plurality of nets. The nets may be the records associated with the wires interconnect the plurality of circuit devices or cells. The netlist (e.g., netlist file, design database records) may store the locations of the circuit devices or cells in a fabrication die of the IC. In some embodiments, the locations may be expressed in terms of X, Y coordinates with respect to a Cartesian abscissa and ordinate defined in the die. In other embodiments, the locations may be expressed in terms of polar coordinates. It should be understood that these coordinate systems are non-limiting upon how the system, software modules, and data storage elements may express the location of design elements on the die of the IC, as a designer or distinct software module may define or enforce a location referencing system for defining and referring the particular location of design elements in the die of the IC.

The exemplary system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities).

Figure 2:
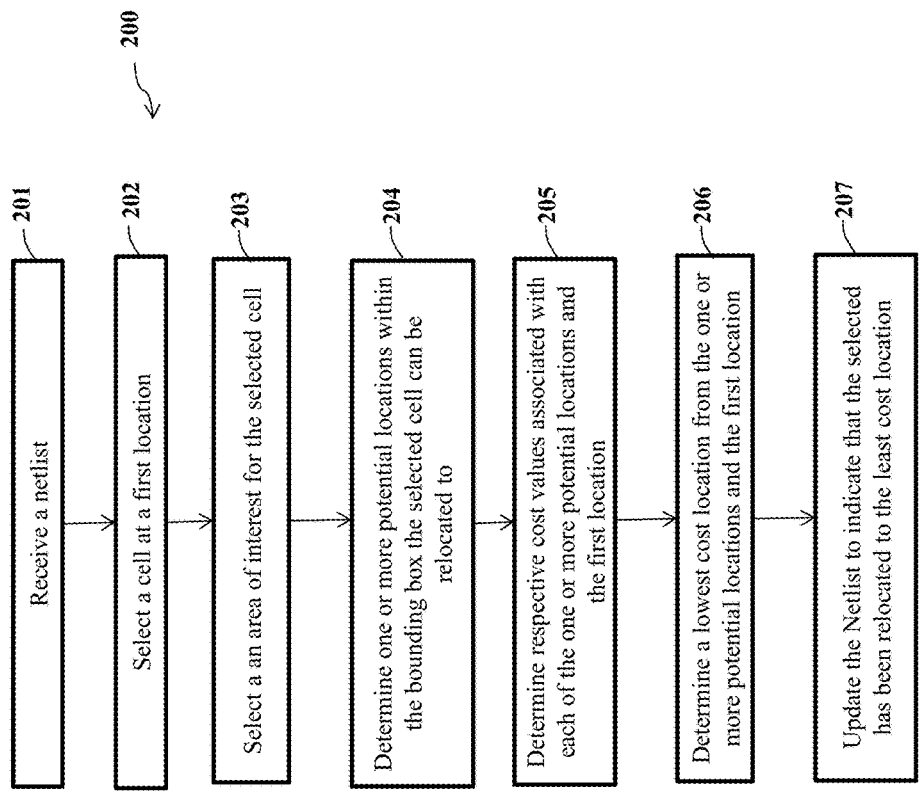
FIG. 2 is a schematic diagram illustrating a method, according an exemplary embodiment.

FIG. 2 schematically illustrates execution of an IC design tool, according to an exemplary method 200. The exemplary operation may be an iteration within a set of multiple iterations. The exemplary operation may be implemented during a local placement stage, local routing stage, global placement stage, global routing stage, clock-tree synthesis stage, and/or any other stages of an IC design flow.

In step 201, the IC design tool may receive a netlist (e.g. a netlist file, a design database) from another design tool or from an associated computer. The netlist file may include a plurality of records for a plurality of cells and a plurality of nets (the wires) that interconnect the plurality of cells. The plurality of records for the plurality of cells may also include the location information of the plurality of cells and/or the plurality of nets in the die of an IC. In operation, the IC design tool, or another software-based design tool executed by the computer, may use the data stored in the netlist file or the database records to determine the location information of each circuit device of the IC, during a global placement and routing stage of the IC design. In some embodiments, the locations may be expressed in terms of X, Y coordinates with respect to a Cartesian abscissa and ordinate defined in the die. In other embodiments, the locations may be expressed in terms of polar coordinates. It should be understood that these coordinate systems are not limiting upon how an IC design system, the software modules of the IC design tool, and data storage elements of the IC design system may express the location of design elements on the die of the IC, as a designer or distinct software module may define or enforce a location-referencing system that defines or refers to the particular locations of the cells in the die of the IC.

In step 202, the IC design tool may select a cell as a candidate for relocation to reduce congestion and/or wirelength. In some embodiments, the IC design tool may select the candidate cell based on a congestion estimate, which may be determined by a global placement and/or a global routing software module. The congestion estimate may include indications, associated with the netlist, of high congestion areas and low congestion areas. The congestion estimate may be stored in a non-transitory computer-readable or processor-readable media. For example, the IC design tool may select database records of a cell in a netlist, from a high congestion area as indicated by the congestion estimate. Alternatively or additionally, the IC design tool may select database records of cell in the netlist, from a low congestion area as indicated by the congestion estimate.

In some embodiments, the IC design tool may select the candidate cell based on an estimate of the packing (or a packing estimate) of circuit devices. The packing estimate may be determined by a global placement and/or a global routing software module and may be stored in the non-transitory computer-readable or processor-readable media. The packing estimate may include indications, associated with the netlist, of areas with under-packing and areas with over-packing. The IC design tool may select database records of cell in the netlist, from an area with under-packing, as a candidate for relocation to reduce the wirelength. Additionally or alternatively, the IC design tool may select a cell based on the wirelength associated at least one connection pin of the cell. For example, the IC design tool may query the database records to determine the wirelengths of the wires connected to the pins of the cell. The cells with shorter connections may have less flexibility for relocation compared to the cells with longer connections, and the IC design tool may select the cells with shorter connections during initial iterations and then may select the cells with longer connections in later iterations. Moreover, in some embodiments, the IC design tool may select the cell at random, regardless of whether the cell is in a high congestion area or a low congestion area. In some cases, the IC design tool may be configured to select each and every cell in the circuit configuration for the purpose of reducing congestion and/or reducing the wirelength.

In some embodiments, the IC design tool may query the database records for the locations of the plurality of cells and the plurality of nets and determine one or more high congestion areas based on the locations. For example, the IC design tool may determine that all of the tracks within a wiring channel may have been occupied thereby making the channel congested. Alternatively, the IC design tool may determine that the number of wires located in the channel exceeds the number of wiring tracks in the channel thereby making the channel congested. The IC design tool may then select the database record of a cell proximate to the location of one or more congested channel as a candidate cell for relocation. In addition or in the alternative, the IC design tool may determine one or more areas having under-packed cells based on the locations of the cells in the database records. For example, the IC design tool may determine that the distances between the cells exceed a threshold value and determine that the cells are under-packed. In addition or in the alternative, the IC design tool may determine that the amount of area occupied by the cells in a given region is below a threshold value and determine that the cells are under-packed. The IC design tool may select a database record of a cell from the under-packed area as a candidate for relocation. For instance, the IC design tool may relocate the selected cell within the under-packed region for a more tight packing of the cells to reduce wirelength.

The IC design tool may tessellate a grid structure on the circuit configuration as indicated by the netlist to divide the circuit configuration into a plurality of bins. For each of the bins, the IC design tool may query the database records of the netlist to determine whether the bin has congestion. In addition or in the alternative, the IC design tool may query the database records to determine whether the cells are under-packed in each of the bins. The IC design tool may then select a cell from a high congestion bin for a possible relocation to reduce congestion. In addition or in the alternative, the IC design tool may select a cell from a bin with under-packed bins to reduce the wirelength in the bin by packing the cells in the bin closer together After selecting a cell as a candidate for relocation, the IC design tool may determine an area of interest associated with the cell in step 203. The area of interest may define a threshold boundary for relocating the cell. In other words, the potential locations that the cell can be moved to may be within the area of interest. In some instances IC design tool may select the area of interest such that the selected cell may be towards the center of the area of interest. In other instances, the IC design tool may select the area of interest such that the selected cell may be towards the periphery of the area of interest. However, these positions of the selected cell within the area of interest are merely exemplary, and the IC design tool may select the area of interest such that the selected cell is within the area of interest regardless of the position of the selected cell within the area of interest. In some embodiments, the IC design tool may select the area of interest such that the selected cell is outside the area of interest. It should also not be construed that the area of interest may only have a regular geometric pattern such as a rectangle, square, or a circle. The area of interest, based upon a plurality of parameters examples of which are described herein, may be irregularly shaped.

In some embodiments, the IC design tool may select the area of interest based on estimation metrics stored in the non-transitory computer-readable or processor-related media. Estimation metrics may include a probabilistic assessment of congestion and/or wirelength for a given placement of the cells. Based on a database query of the estimation metrics, the IC design tool may determine that potential locations for the cell outside of a threshold boundary from the selected cell will almost always result in more congestion, more wirelength, and/or other routing problems. The IC design tool may then determine and select the area of interest based on the threshold boundary. Furthermore, the threshold boundary may be direction dependent, thereby forming a geometrically non-uniform area of interest. The IC design tool may determine the area of interest based on the connections of the selected cell to other cells of the IC. For instance, the IC design tool may select an area of interest to include the cells that are directly wired to the selected cell. In other instances, the IC design tool may select the cells one connection removed from the selected cell.

In some embodiments, the IC design tool may determine the area of interest based on the length of the wires connecting the selected cell to the other cells of the IC. The IC design tool may select an area of interest to include the cells connected to the selected cells with shorter wires and to exclude the cells connected with longer wires. The longer wires may have a greater flexibility and therefore may be rerouted in other stages of design flow or other iterations of the exemplary method 200. The shorter wires however may have a lower flexibility, and therefore the IC design tool may determine that an optimal routing for the shorter wires should be determined in the current iteration of the exemplary method 200. The IC design tool may determine the area of interest based on designer defined circuit blocks in the IC design configuration. For example, the IC design configuration may include one or more intellectual property (IP) blocks, which may be predefined collections of circuitry that are often patented and licensed from a third party, and thus cannot or should not be altered. The IC design tool may select the area of interest so as to avoid the IP blocks. In some embodiments, a designer may have designated a circuit block to be critical and unalterable, and the IC design tool may use such designation to select the area of interest to avoid the critical circuit blocks.

In some embodiments, the IC design tool may query the database records to determine that the designer has specified a smaller area of interest for the selected cell. For example, the database records may indicate that the designer has specified that the selected cell may not be moved beyond a certain distance. In such embodiments, the IC design tool may determine a smaller area of interest in accordance with the designer's specifications.

In some embodiments, the IC design tool may determine the area of interest based upon the packing of the cells proximate to the selected cell. For example, the IC design tool may determine an area with cells separated by a relatively lower distance as an over-packed area. In addition or in the alternative, the IC design tool may determine an area with the cells occupying a larger fraction of the area as an over-packed area. In contrast, the IC design tool may indicate an area with cells separated by a relatively higher distance as an under-packed area. In addition or in the alternative, the IC design tool may determine an area with the cells occupying a smaller fraction of the area as an under-packed area. The IC design tool may query the database records in the netlist, which may include the locations and the physical dimensions of the plurality of cells, to determine under-packing and/or over-packing. In some instances, the IC design tool may select the area of interest to include under-packed areas such that the IC design tool may relocate the selected cell to an under-packed area.

The IC design tool may determine the area of interest based upon level of congestion in areas the proximate to the selected cell. Level of congestion may be based upon the percentage of tracks occupied by interconnecting wires in one or more wiring channels. For example, if the interconnecting wires occupy more than eighty percent of the tracks in a first wiring channel, the IC design tool may designate that the first wiring channel has a high congestion. In contrast, if the interconnecting wires occupy less than thirty percent of the tracks in the first wiring channel, the IC design tool may designate that the first wiring channel has a low congestion. The IC design tool may indicate an area including channels with high congestion as high congestion areas. The IC design may indicate an area including channels with low congestion as low congestion areas. The IC design tool may include low congestion areas in the area of interest such that the selected cell may be relocated to a low congestion area without significantly increasing congestion in the low congestion area. For example, the IC design tool may determine that such relocation increases the congestion in the low congestion area from thirty percent to fifty percent.

In step 204, the IC design tool may select one or more potential locations within the area of interest that the selected cell can be relocated to. The IC design tool may select the one or more potential locations based on the relative packing of the cells and/or the congestion within the area of interest. For example, the IC design tool may determine an area within the area of interest to be under-packed and select a location within the under-packed area as a potential location.

In some embodiments, the IC design tool may select potential location that already contains a cell. In such embodiments, the IC design tool may relocate the cell at the potential location to the original location of the selected cell and the selected cell to the potential location based on the cost determinations disclosed below. The IC design tool may select one or more potential locations within the area of interest in a particular direction. For example, for a IC design using a Cartesian system, the IC design tool may query the database to determine that that every location in the Y direction from the selected cell may include locations that would always have more congestion and/or more wirelength if the selected cell is moved to such locations. In such a situation, the IC design tool may determine the one or more locations potential locations in the X direction.

In some embodiments, the IC design tool may randomly select a potential location within the area of interest. In some embodiments, the IC design may select each of the locations within the area of interest as a potential location.

In step 205, the IC design tool may determine costs associated with each of the one or more potential locations for the selected cell. A cost of a particular location for the selected cell may convey the costs associated with wirelength and congestion when the selected cell is moved to or at that particular location. For example, moving the selected cell to a location with a lower cost may result in an IC design having a shorter wirelength and/or lower congestion. On the other hand, moving the selected cell to a location with a higher cost may result in an IC design having a longer wirelength and/or higher congestion. However, it should not be construed that the cost is based on just wirelength and congestion—the cost may include additional or alternative parameters such as power consumption efficiency, ease of fabrication, and die size.

The IC design tool may determine a cost associated with a first potential location in the set of one or more potential locations based upon one or more costs associated with each of one or more connection pins of the selected cell. The cost for each of the connection pins may be based upon the wirelength and congestion associated with the wire (or the net) connected to the pin. For example, the IC design tool may tentatively move the selected cell to the first potential location and for a first pin of the selected cell, the IC design tool may implement a routing propagation process to wire the first pin with a first cell that the first pin was wired to. The IC design tool may then determine, based on the routing propagation, the number of units of wires or the wirelength required to wire the first pin to the first cell. Furthermore, the IC design tool may determine the congestion value as a result of the updated wiring from the first pin of the selected cell at the first potential location to the first cell. The IC design tool may then determine the cost associated with the first pin of the selected cell at the first potential location based upon the wirelength and congestion, in accordance with a tentative movement of the selected cell to the first potential location. However, it should not be construed that the IC design tool determines the cost associated with the first pin solely based on wirelength and congestion. The IC design tool may use other parameters, such as the die size, criticality of the wiring, and other parameters set by the designer to determine the cost associated with the first pin.

The IC design tool may determine the costs associated other pins of the selected cell based on the tentative movement of the selected cell to the first potential location. Once the cost for the each of pins has been calculated, the IC design tool may determine a composite cost of the selected cell at the first potential location. In some embodiments, the composite cost of the selected cell at the first potential location may be based upon a weighted sum of the costs associated with each of the pins of the selected cell. For instance, the IC design tool may determine that the designer or previous design processes has indicated that a wire connected to a pin has a higher weight. A higher weight of a wire may convey the criticality of the wire in the circuit.

In some embodiments, the IC design tool may determine the designer's preferences for determining the composite cost. For instance, the designer may have preferred to minimize wirelength and tolerate a higher level of congestion. In other instances, the designer may have preferred to minimize congestion at the expense of having greater wirelength. Furthermore, the designer may have indicated pin specific preference—a first pin may have a higher tolerance for a greater wirelength and/or greater level of congestion compared to a second pin. The IC design tool may query the database records to identify the designer's preferences and determine the composite cost based upon the designer's preferences.

In some embodiments, the IC design tool may not have to determine the costs associated with each of the pins. The IC design tool may select a subset of pins and then determine the individual costs associated with each of the selected pins, and determine the composite cost. For example, the IC design tool may select the subset of pins based on the congestion caused by the wires connected to the pins at the original location of the selected cell. The IC design tool may query the database records to determine that in a previous iteration, only the wires connected to the subset of pins were causing congestion and the wires connected to the remaining pins were connected to a significantly less congested area.

The IC design tool may determine the composite costs associated with the remaining potential locations within the area of interest using a substantially similar process disclosed above. The IC design tool may also determine the composite cost associated with the original location of the selected cell. Based on the composite costs, the IC design tool may determine the lowest cost location for the selected cell, as in step 206. In some instances, the lowest cost location may be the original location of the selected cell. In some instances, the lowest cost location may be one of the potential locations in the area of interest.

In some embodiments, the set of one or more potential locations may already contain a second cell. In such implementations, the IC design tool may determine a composite cost for a second cell by tentatively moving the second cell to the original location of the selected cell. The IC design tool may determine that the selected cell may be swapped with the second cell based on the composite cost for the selected cell at the location of the second cell and the composite cost of the second cell at the original location of the selected cell.

Once the IC design tool determines the lowest cost location, the IC design tool in step 207 updates the netlist to indicate that the selected cell has been moved to the lowest cost location. Furthermore, the IC design tool may update a GUI to indicate the relocation. The IC design tool may update a data field indicating the location of the selected cell in the netlist record of the selected cell. Moreover, the IC design tool may update the records of the nets according to the updated locations, indicating that the wires represented by the nets have been moved to the new location as indicated by the new location for the selected cell.

Figure 3A:
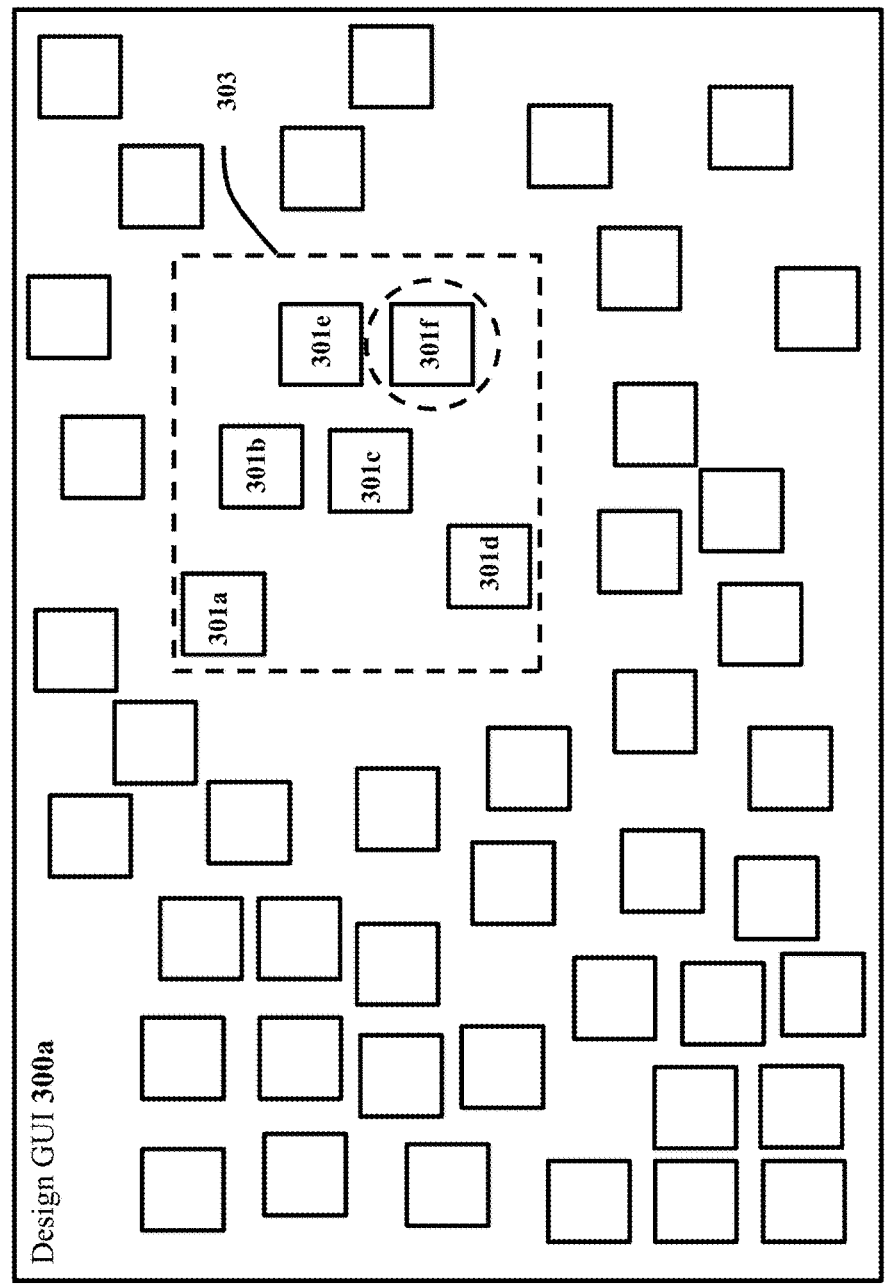
FIG. 3A is a schematic diagram showing a graphical user interface (GUI) rendering a plurality of circuit devices (or "cells"), a selected cell, and an area of interest associated with the selected cell, according to an exemplary embodiment.

FIG. 3A shows an exemplary design GUI 300a generated by an IC design tool during an implementation of an exemplary method, where the design GUI 300a is generated based on data records of a netlist, which may be machine-readable computing file or design database. The circuit configuration shown by the design GUI 300a shows a plurality of cells 301, examples shown as 301a-301f. The design GUI 300a does not show the plurality of wires interconnecting the plurality of cells 301 for the sake of simplicity.

The IC design tool may update the design GUI 300a to indicate a selection of cell for relocation. For example, in the design GUI 300a, the IC design tool may have selected cell 301f for relocation. The IC design tool may further update the design GUI 300a to indicate the area of interest. For example, the design GUI 300a shows an area of interest 303. After the selection of the cell 301f and the area of interest 303 for the selected cell 301f, the IC design tool may query the database records to identify one or more potential locations to relocate the selected cell 301f.

Figure 3B:
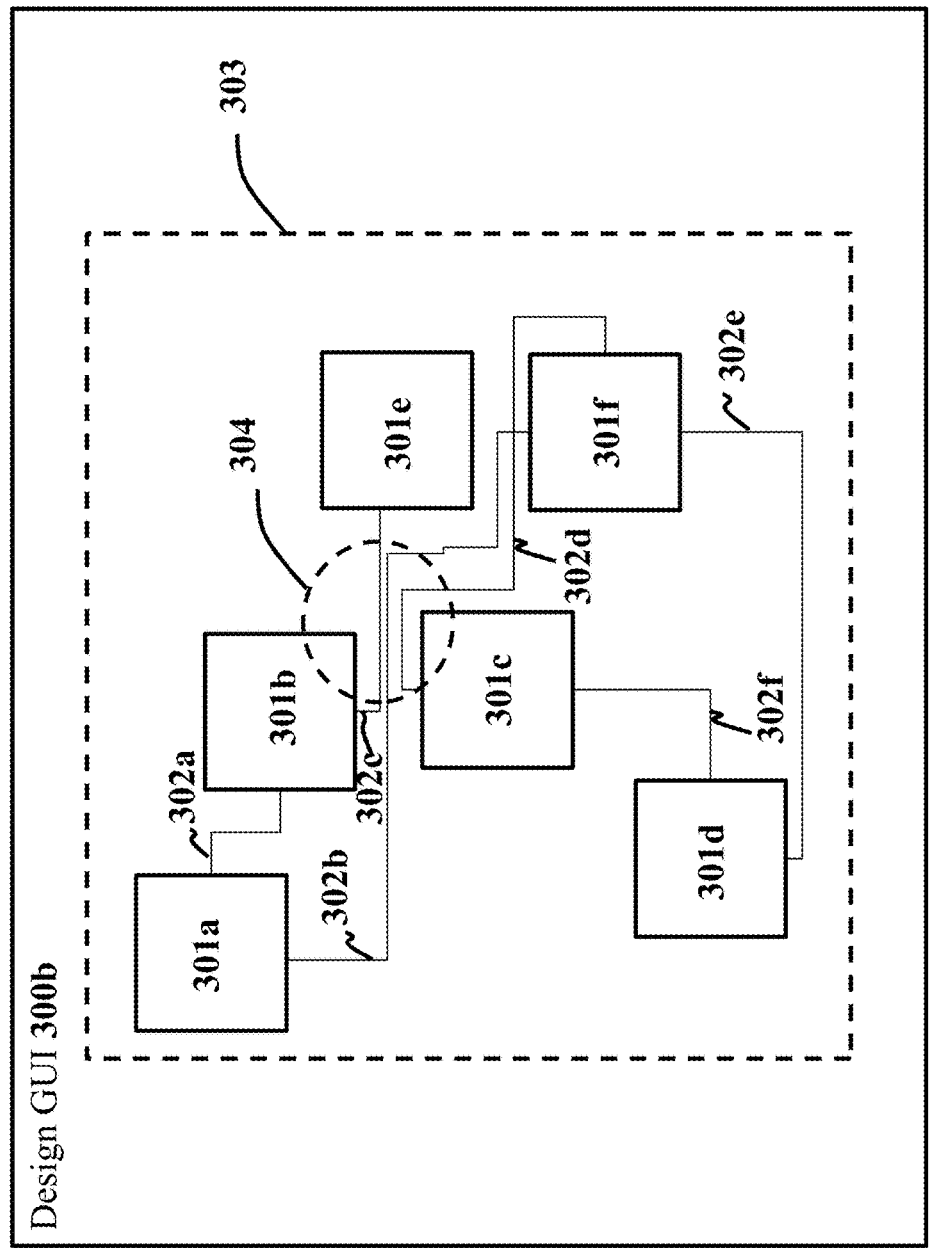
FIG. 3B is a schematic diagram showing an updated GUI rendering a set of cells included in an area of interest.

FIG. 3B shows an exemplary design GUI 300b generated by the IC design tool during the implementation of the exemplary method. The design GUI 300b shows the area of interest containing the cells 301 and the interconnecting wires 302. The interconnecting wires 302 may propagate a signal, such as a clock signal or a logical signal, in between the cells 301. The cells 301 may include one or more pins (not shown) to be connected to the interconnecting wires. For example, the selected cell 301f includes three pins connected to the wires 302b, 302d, 302e. One ordinarily skilled in the art should appreciate that the wires 302 are generally routed in the metal layers above the layer containing the cells 301, and that the wires may span across multiple metal layers.

The design GUI may 300b further indicate an area of congestion 304. The IC design tool may determine the area of congestion based on the number of wires 302 passing in the channel proximate to the cells 301b and 301c. For example, the number of wires (three, as shown) routed through the channel proximate to cells 301b and 301c may be greater than a threshold number of wires for the channel. Alternatively, the channel may not have sufficient area to route the three wires even though a global placement and routing tool may have tentatively placed those three wires in the channel proximate to the cells 301b and 301c.

The IC design tool may determine an original composite cost associated with the original location of the cell 301f. The original composite cost may be based on the respective costs associated with each of wires 302b, 302d, 302e of the cell 301f. Each of the costs associated with the wires 302b, 302d, 302e may be based on the respective wirelength and/or congestion associated with each of the wires 302b, 302d, 302e.

Figure 3C:
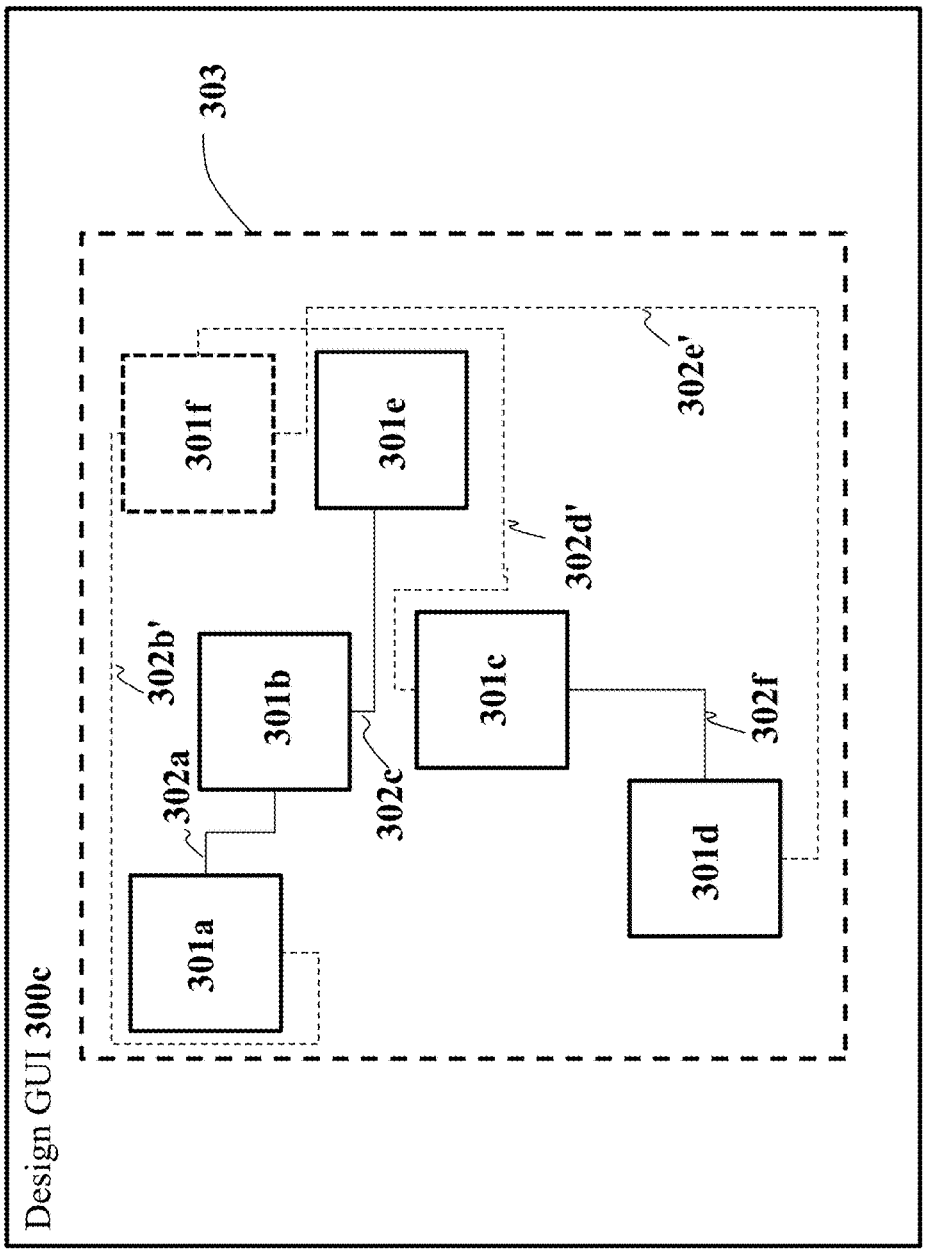
FIG. 3C is a schematic diagram showing an updated GUI rendering a potential relocation of the selected cell to a first location within the area of interest.

FIG. 3C shows an exemplary design GUI 300c generated by the IC design tool during the implementation of the exemplary method. The IC design tool may determine a first potential location for the selected cell 301f. The design GUI 300c shows the cell 301f as if the cell 301f had been relocated to the first potential location along with the rerouting of the wires 302b, 302d, 302e, shown respectively as 302b', 302d', 302e' connected to the cell 301f. For the first potential location shown in the exemplary design GUI 300c, the IC design system may determine costs associated with each of the wires 302b', 302d', 302e'. For each of the wires 302b', 302d', 302e', the respective cost may be based upon the respective wirelength and/or the congestion due to the rerouting. The IC design system may then determine a first composite cost associated with the first potential location based on the costs associated with each of the wires 302b', 302d', 302e'.

Figure 3D:
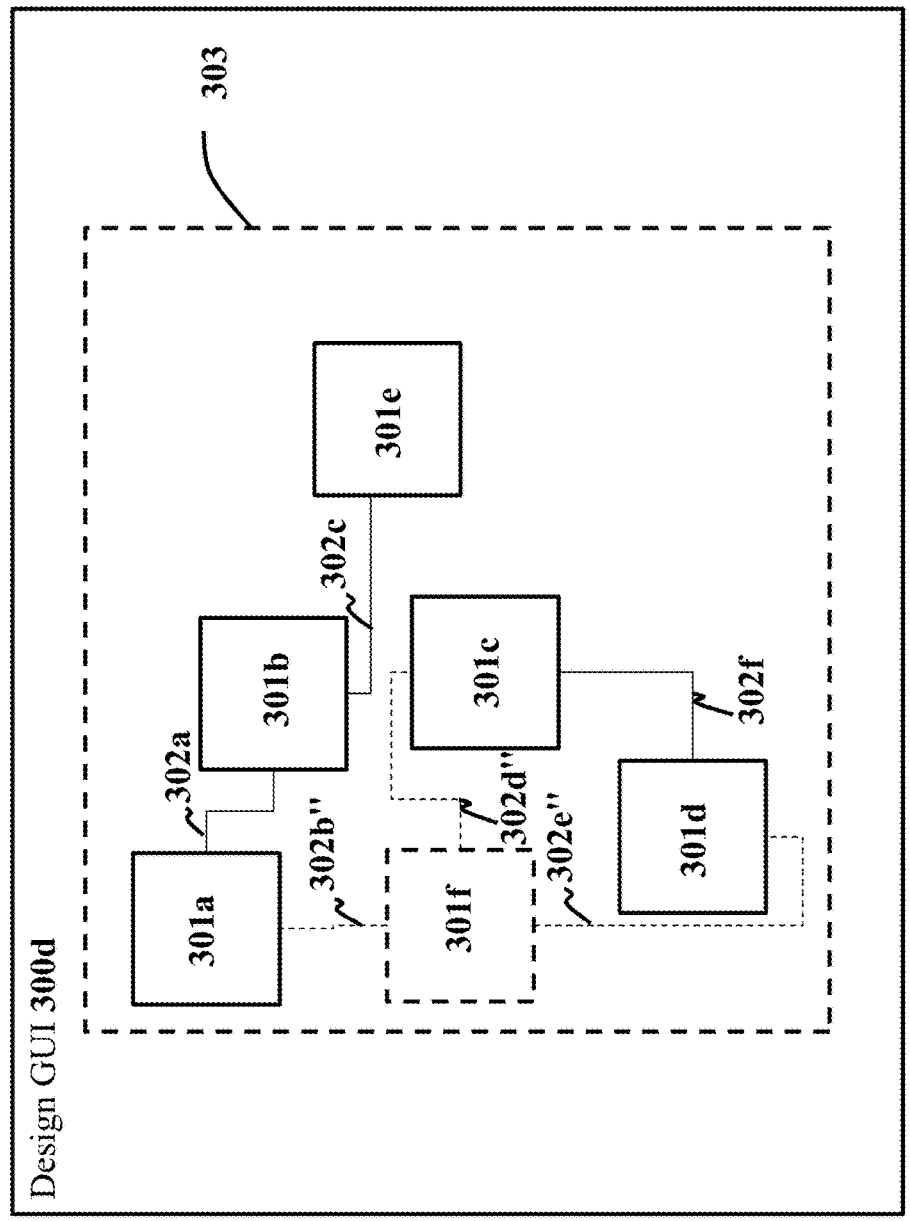
FIG. 3D is a schematic diagram showing an updated GUI rendering a potential relocation of the selected cell to a second location within the area of interest.

FIG. 3D shows an exemplary design GUI 300d generated by the IC design tool during the implementation of the exemplary method. The IC design tool may determine a second potential location for the selected cell 301f. The design GUI 300d shows the cell 301f as if the cell has been relocate to the second potential location along with rerouting of the wires 302b, 302d, 302e, shown respectively as 302b", 302d", 302e" connected to the cell 301f. For the second potential location shown in the exemplary design GUI 300c, the IC design system may determine costs associated with each of the wires 302b", 302d", 302e". For each of the wires 302b", 302d", 302e", the respective cost may be based upon the respective wirelength and/or the congestion due to the rerouting. The IC design system may then determine a second composite cost associated with the second potential location based on the costs associated with each of the wires 302b", 302d", 302e".

The IC design tool may then compare the original composite cost, the first composite cost, and the second composite cost to determine a new location for the cell 301f. In some instances, the IC design tool may determine that the original location has the lowest cost and therefore the cell 301f should not be relocated. In some instances, the IC design tool may determine that the first potential location has the lowest cost and therefore the cell 301f should be relocated to the first potential location. In other instances, the IC design tool may determine that the second potential location has the lowest cost and therefore the cell 301f should be relocated to the second potential location. After the IC design tool determines the lowest cost location, the IC design tool may update the database records to indicate that the cell 301f has been moved to the lowest cost location.

Figure 3E:
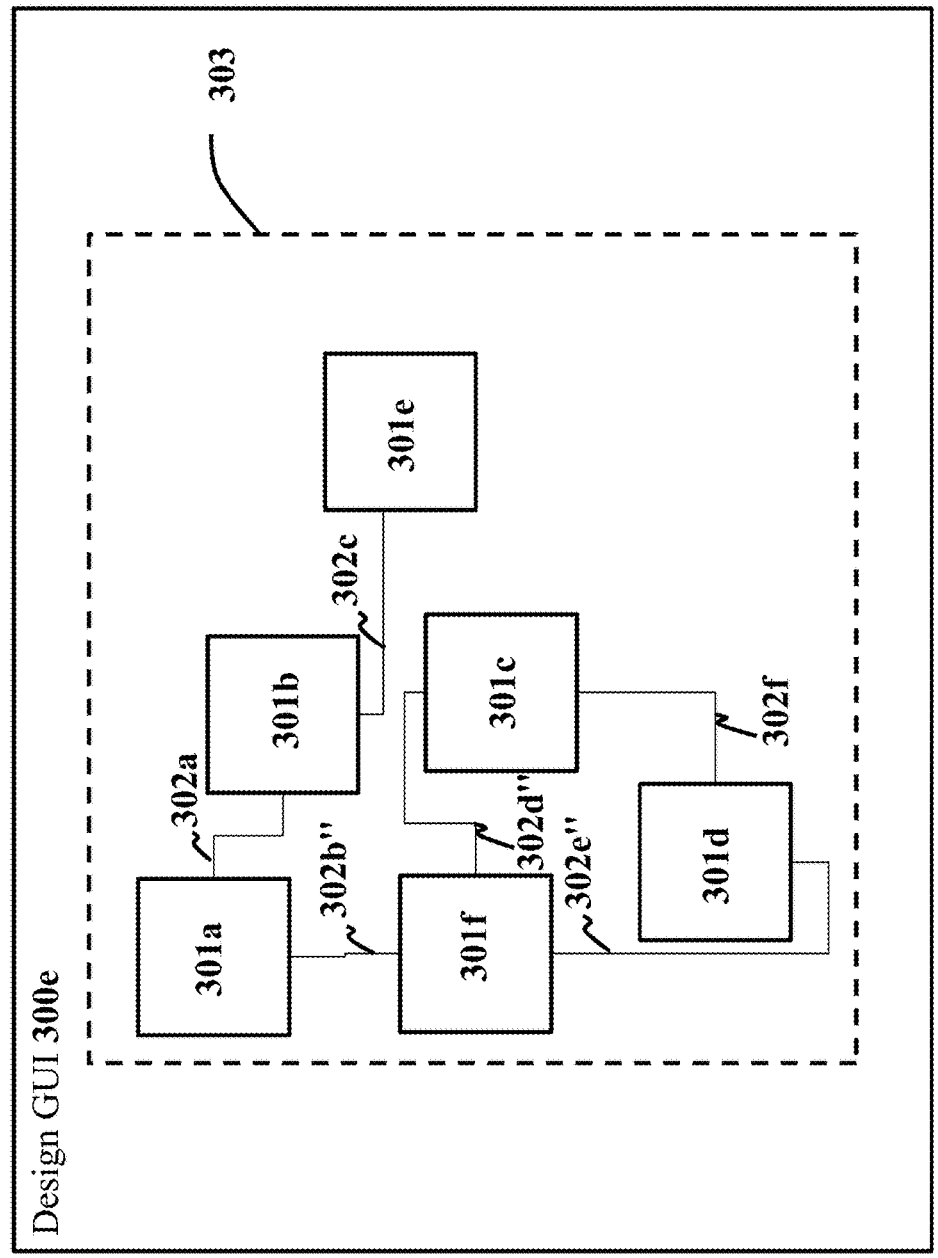
FIG. 3E is a schematic diagram showing an updated GUI rendering a relocation of the selected cell to the second location within the area of interest.

For example, FIG. 3E shows an updated GUI 300e generated by the IC design tool during the detailed placement and routing process. The IC design tool may have determined that the second potential location as the lowest cost location for moving the cell 301f and updated the database records accordingly. In addition, the IC design tool may the update the database records to indicate the routing of wires 302b", 302d", 302e".

Figure 4A:
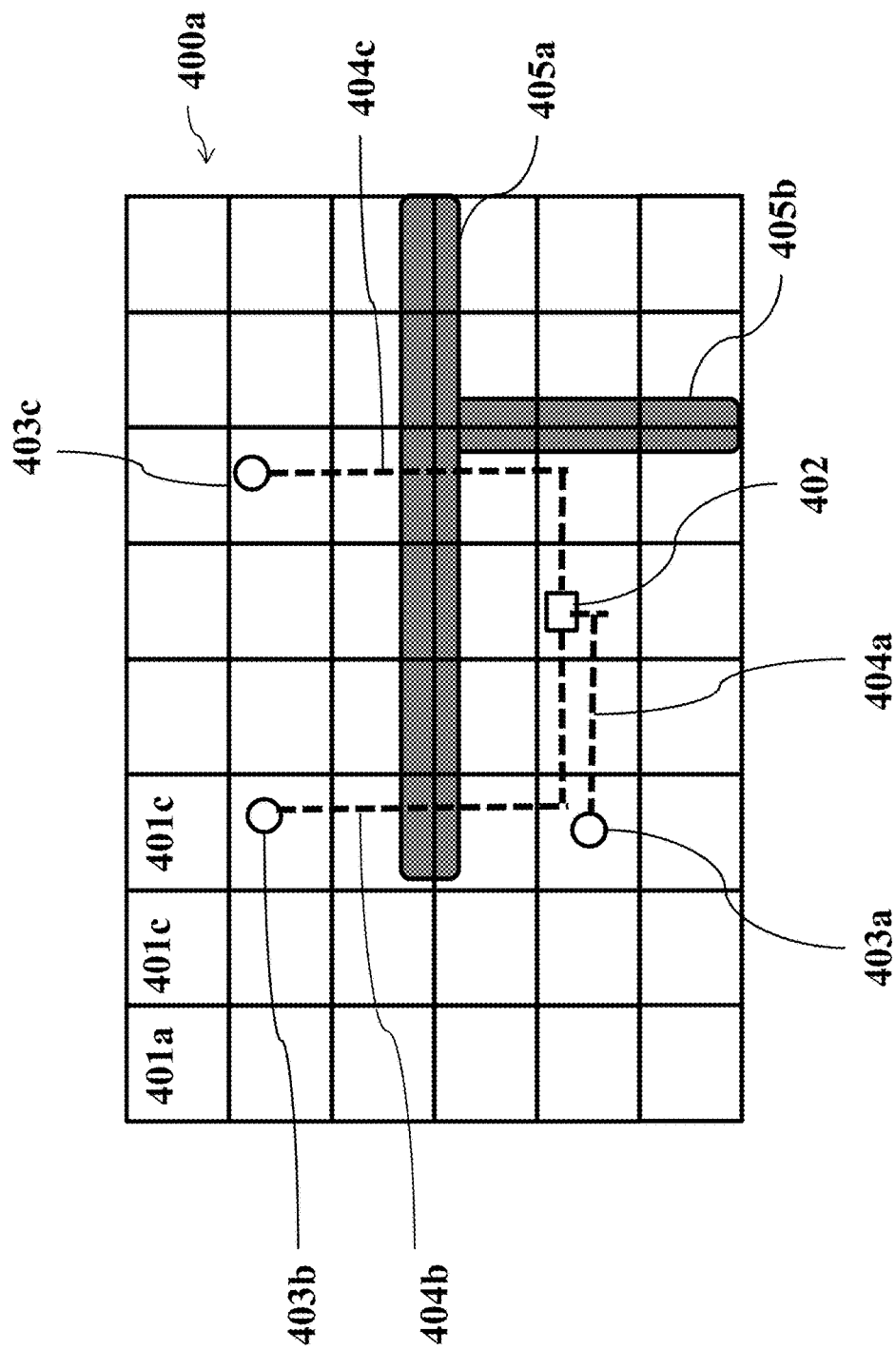
FIG. 4A is a schematic diagram showing a circuit routing map rendering a partition of an integrated circuit (IC) design into a plurality of bins, a candidate cell, and a first cell, a second cell and a third cell connected thereto.

FIG. 4A shows an exemplary circuit routing map 400a generated by an IC design tool during an implementation of an exemplary method based on data records of a netlist, which may be machine-readable computing file (e.g., netlist file) or design database. The circuit routing map 400a shows an IC design partitioned into a plurality of rectangular bins 401 to create a global routing grid. Each of the tiles 401 may accommodate a certain number of routing tracks. The circuit routing map 400a also shows routing blockages or congested areas 405. The IC design tool may not route wires or nets through the routing blockages or congested areas 405. The circuit routing map 400a also shows a candidate cell 402 for relocation that may be moved by the IC design tool to optimize the IC design. The candidate cell 402 is wired to first, second, and third cells 403a, 403b, 403c through the first, second, and third nets 404a, 404b, 404c respectively.

Figure 4B:
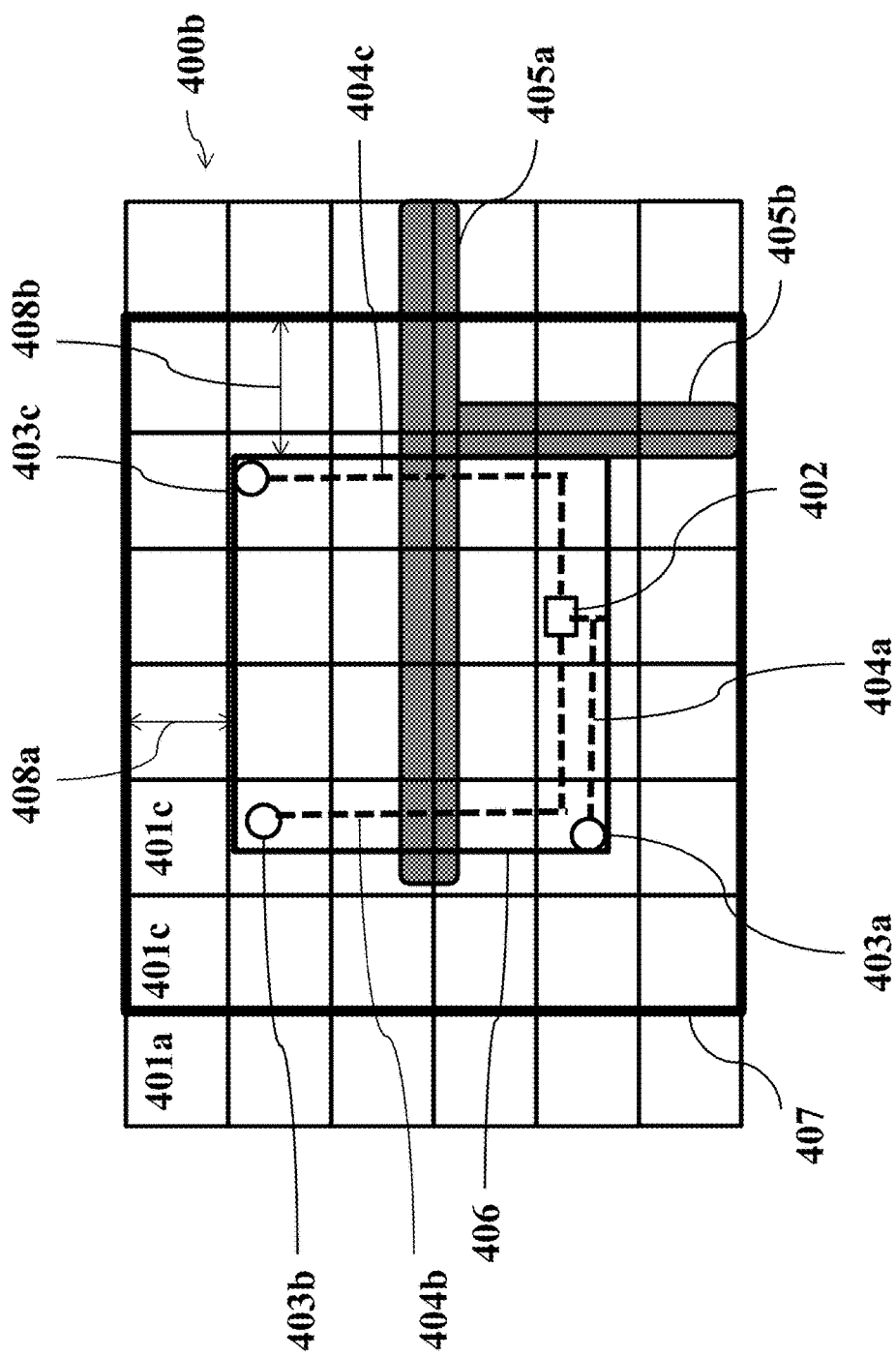
FIG. 4B is a schematic diagram showing a circuit routing map rendering a net bounding box and a second bounding box for routing cost computation.

FIG. 4B shows a circuit routing map 400b generated by the IC design tool during the implementation of the exemplary method. The circuit routing map 400b shows a net bounding box 406 that may include the cells 403 connected to the candidate cell 402. The circuit routing map 400b also shows a bounding box 407 for the routing cost calculations. The IC design tool may generate a bounding box 407 for the routing cost calculations by expanding the net bounding box 406 by distances 408.

Figure 4C:
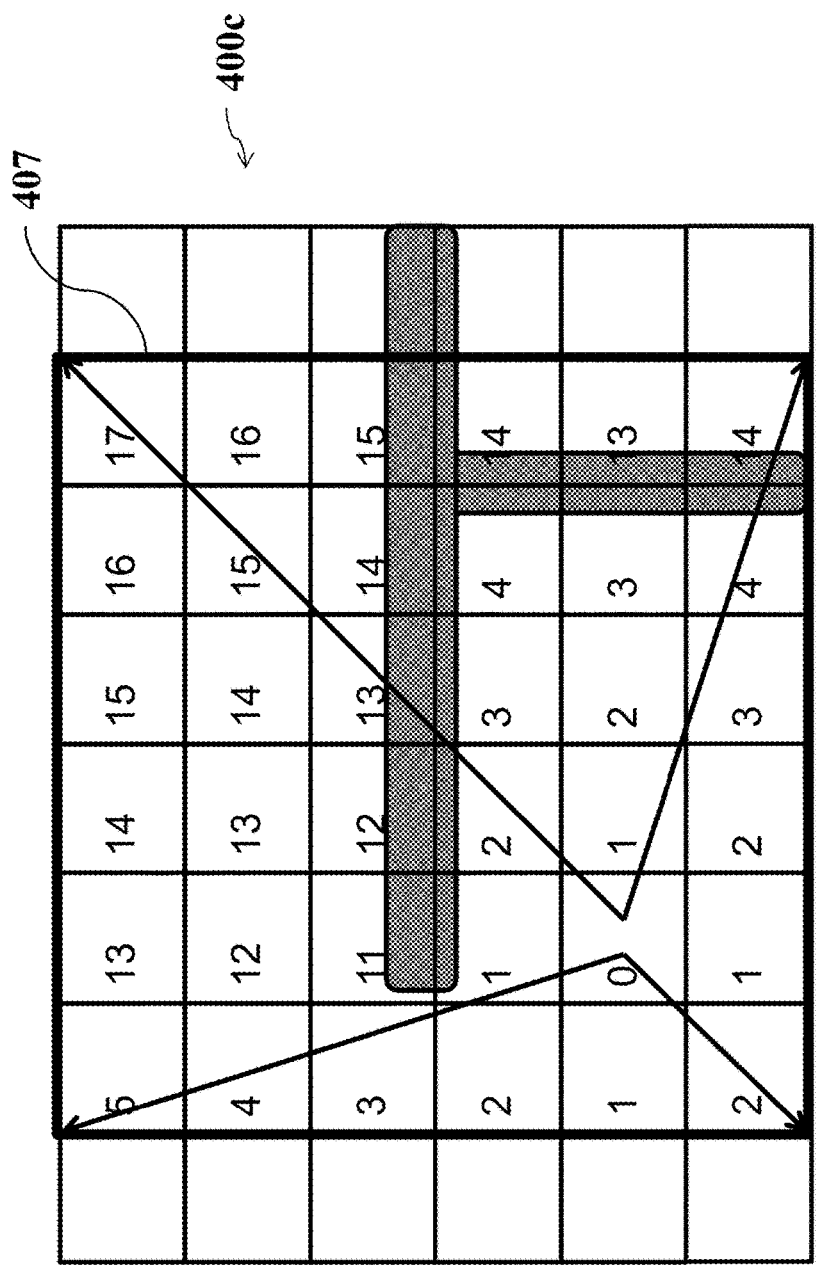
FIG. 4C is a schematic diagram showing a circuit routing map rendering the routing cost of routing a net from the candidate cell placed at each of the bins within the second bounding box to the first cell.

FIG. 4C shows a circuit routing map 400c generated by the IC design tool during the implementation of the exemplary method. The circuit routing map 400c shows the routing costs of monotonically routing the first net 404a from the candidate cell 402, placed at each of the bins 401, to the first cell 403a. For the sake of simplicity, only the bounding box 407 has been labeled and the routing costs of the first net 404a from each of the bins 401 have been shown and the other labels have been omitted for the sake of simplicity.

Figure 4D:
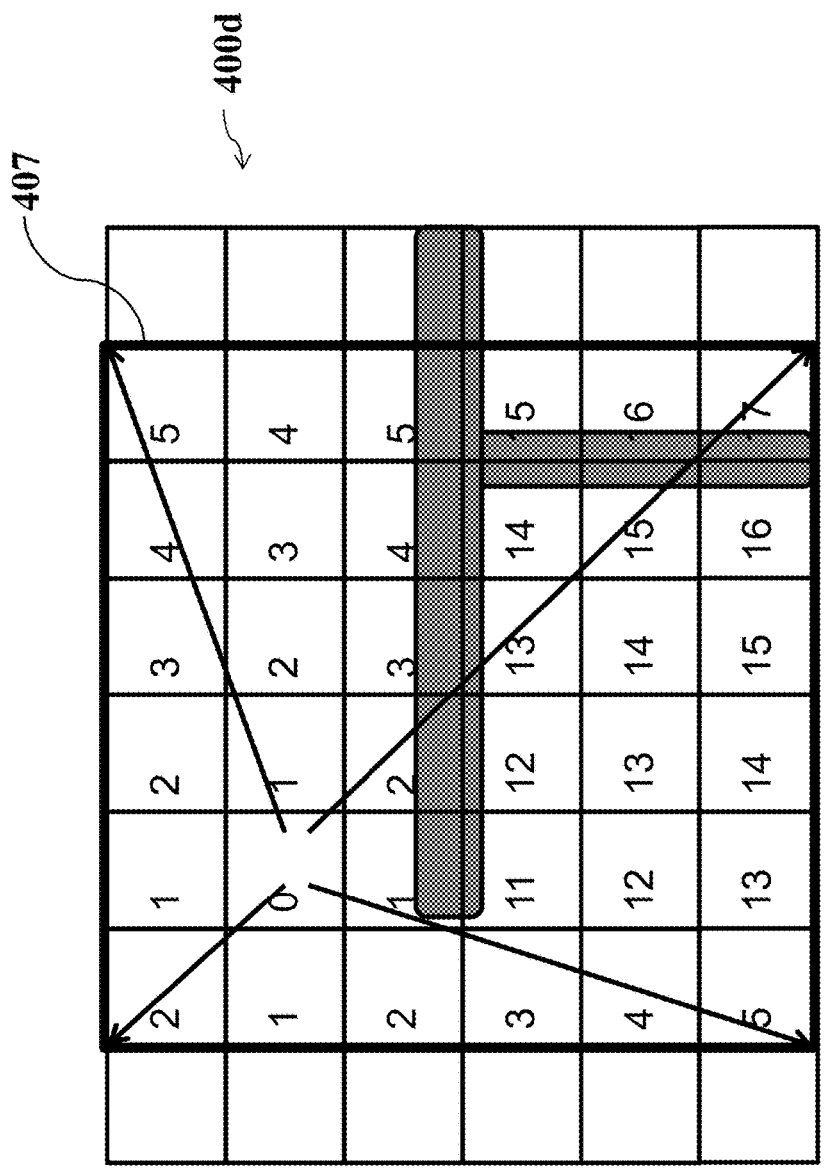
FIG. 4D is a schematic diagram showing a circuit routing map rendering the routing cost of routing a net from the candidate cell placed at each of the bins within the second bounding box to the second cell.

FIG. 4D shows a circuit routing map 400d generated by the IC design tool during the implementation of the exemplary method. The circuit routing map 400d shows the routing costs of monotonically routing the second net 404b from the candidate cell 402, placed at each of the bins 401 to the second cell 403b. For the sake of simplicity, only the bounding box 407 has been labeled and the routing costs of the second net 404b from each of the bins 401 have been shown and the other labels have been omitted for the sake of simplicity.

Figure 4E:
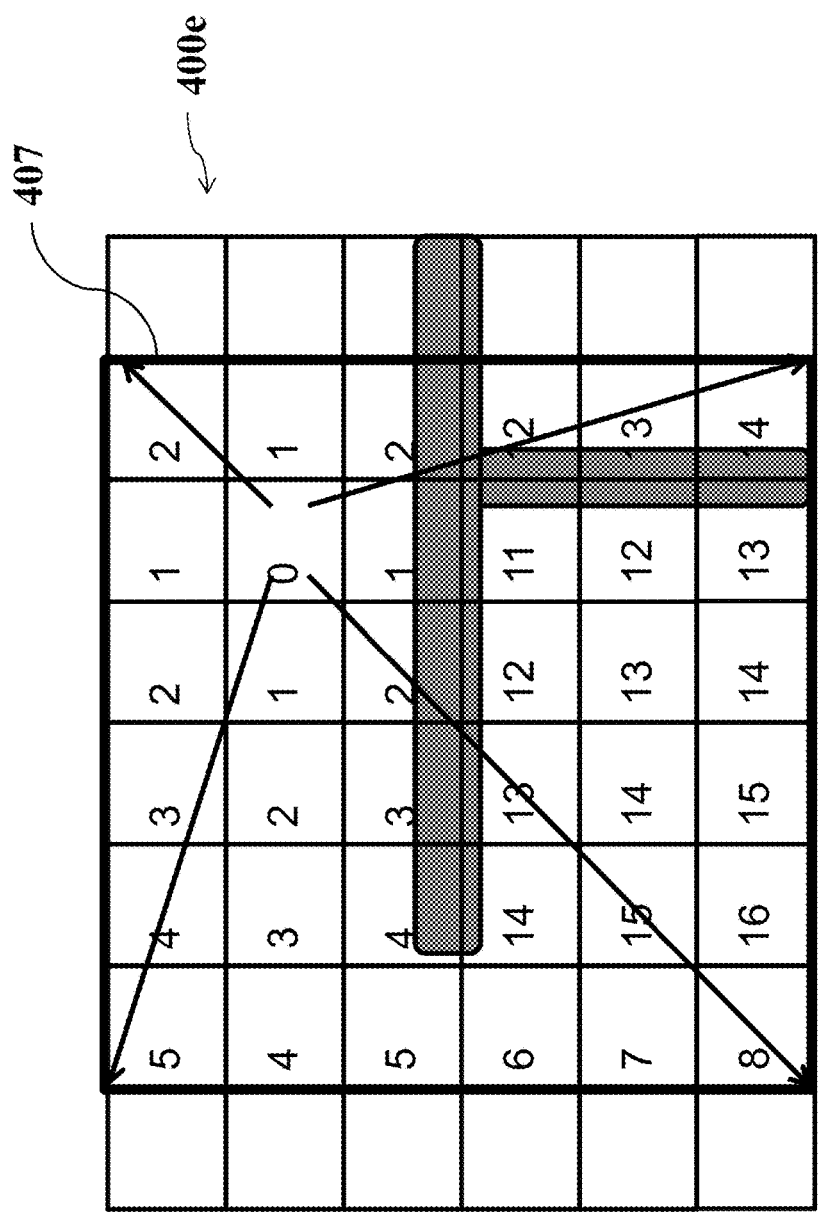
FIG. 4E is a schematic diagram showing a circuit routing map rendering the routing cost of routing a net from the candidate cell placed at each of the bins within the second bounding box to the third cell.

FIG. 4E shows a circuit routing map 400e generated by the IC design tool during the implementation of the exemplary method. The circuit routing map 400e shows the routing costs of monotonically routing the third net 404c from the candidate cell 402, placed at each of the bins 401 to the third cell 403c. For the sake of simplicity, only the bounding box 407 has been labeled and the routing costs of the third net 404c from each of the bins 401 have been shown and the other labels have been omitted for the sake of simplicity.

FIG. 4F shows a circuit routing map 400f generated by the IC design tool during the implementation of the exemplary method. The circuit routing map 400f shows the composite costs of placing the candidate cell 402 at each of the bins 401 within the bounding box 407. The IC design tool may determine the composite costs adding up the costs of monotonically routing the first net 404a to the first cell 403a from the candidate cell 402 placed at each of the bins 401 as shown in FIG. 4C, the costs of monotonically routing the second net 404b to the second cell 403b from the candidate cell 402 placed at each of the bins 401 as shown in FIG. 4D, and the costs of monotonically routing the third net 404c to the third cell 403c from the candidate cell 402 placed at each of the bins 401 as shown in FIG. 4E. As shown in the circuit routing map 400f, the lowest cost bin has a composite cost of nine, and the IC design tool may place the candidate cell 402 at the lowest cost bin.

Figure 4G:
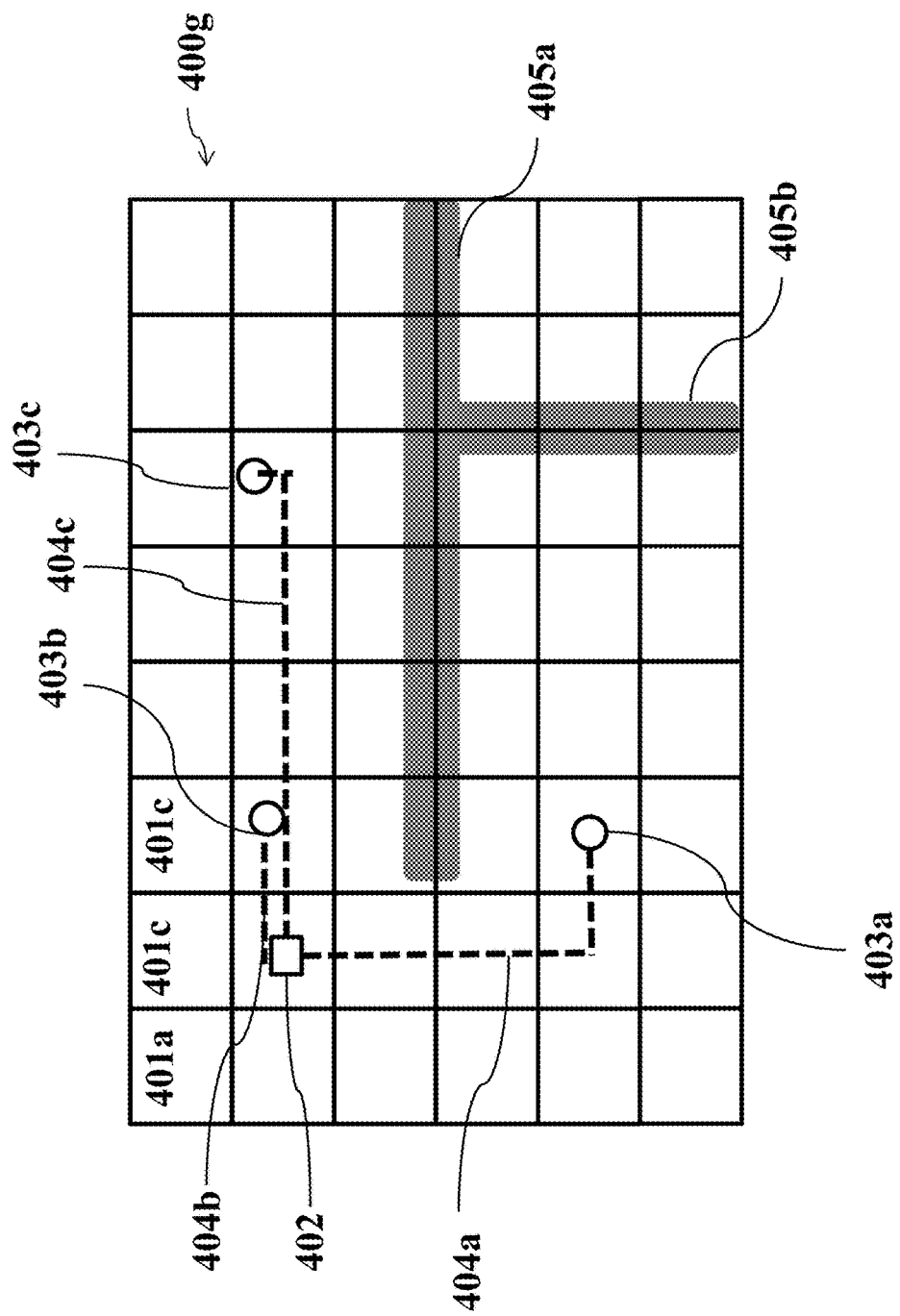
FIG. 4G is a schematic diagram showing a circuit routing map rendering an optimal placement of the candidate cells and the corresponding rerouting of the nets.

FIG. 4G shows a circuit routing map 400g generated by the IC design tool during the implementation the exemplary method. In the circuit routing map 400g, the IC design tool has placed the candidate cell 402 at the bin 401 with the lowest cost and may have accordingly updated the database record of the candidate cell 402 in the netlist. Furthermore, the IC design tool has rerouted the nets 404 from the lowest cost bin 401 to the cells 403 and may have accordingly updated the database records of the nets 404 in the netlist. The placement of the candidate cell 402 at the lowest cost location may improve the wirelength and/or congestion in the IC.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented circuit design method comprising:
    receiving, by a computer, a netlist file comprising a plurality of records of a plurality of circuit devices and a plurality of nets interconnecting the plurality of circuit devices forming an integrated circuit (IC), wherein each respective record of a circuit device or a net indicates a location of the circuit device or the net;
    identifying, by the computer, a potential second location for a first circuit device at a first location, based upon one or more records of at least one of a circuit device and a net indicating the circuit device or the net has a location proximate to the first location of the first circuit device as indicated by a record of the first device;
    determining, by the computer, for a first net connected to the first circuit device at the second location, a wirelength value and a congestion value associated with the first net;
    determining, by the computer, a cost associated with the first net based upon the wirelength value and the congestion value associated with the first net;
    identifying, by the computer, a record of a second circuit device at the second location;
    determining, by the computer, for a second net connected to the second circuit device at the first location, a wirelength value and a congestion value associated with the second net;
    determining, by the computer, a cost associated with the second net based upon the wirelength value and the congestion value associated with the second net;
    determining, by the computer, a composite cost for the first circuit device at the second location based upon one or more costs associated with one or more nets including the first net connected to the first circuit device at the second location;
    determining, by the computer, a composite cost for the second circuit device at the first location based upon one or more costs associated with one or more nets including the second net connected to the second circuit device at the first location; and
    in response to the computer determining that, for the first circuit device, the second location has a lower composite cost than the first location and, for the second circuit device, the first location has a lower composite cost than the second location:
        updating, by the computer, location information in the record of the first circuit device in the netlist file, from the first location to the second location and location information in the record of the second circuit device, from the second location to the first location, whereby the respective routing cost of at least a portion of the IC decreases responsive to updating the location information for the first and second circuit devices, and wherein the updated location information for the first and second circuit devices in the netlist file is provided to a fabrication facility for fabricating the IC.

2. The method of claim 1, further comprising:
    generating, by the computer a graphical user interface (GUI) representing IC design based upon the netlist file, the GUI configured to display one or more of the plurality of the circuit devices and one or more of the plurality of nets according to the records of the netlist file, wherein the computer is configured to update the GUI display of the circuit devices and the nets in response to the computer updating the record of the first circuit device in the netlist file.

3. The method of claim 1, further comprising:
    determining, by the computer, a set of one or more congestion values associated with one or more areas in the IC based upon the location in one or more records of at least one of the plurality of nets;
    determining, by the computer, a set of one or more values indicating packing of circuit devices in the one or more areas in the IC based upon the location in the one or more records of at least one of the plurality of circuit devices; and
    identifying, by the computer, the first circuit device at the first location based upon at least one of the set of one or more of congestion values and the set of one or more values indicating packing of circuit devices.

4. The method of claim 1, further comprising:
    determining, by the computer, a set of one or more congestion values associated with one or more areas in the IC proximate to the first location based upon the location of at least one net in the one or more areas;
    determining, by the computer, a set of one or more values indicating packing of circuit devices in the one or more areas based upon the location of at least one circuit device in the one or more areas; and
    determining, by the computer, an area of interest associated with the first circuit device based upon at least one of the set of one or more congestion values and the set of one or more values indicating packing of circuit devices.

5. The method of claim 4, further comprising:
    determining, by the computer, a second set of one or more congestion values associated with a set of one or more areas within the area of interest based upon the location of at least one net within the area of interest;
    determining, by the computer, a second set of one or more values indicating packing of circuit devices in the set of one or more areas within the area of interest based upon the location of at least one circuit device within the area of interest; and
    identifying, by the computer, a set of one or more potential locations including the second location within the area of interest based upon at least the second set of one or more congestion values and the second set of one or more values indicating packing of circuit devices.

6. The method of claim 4, wherein the area of interest includes at least one circuit device wired to the first circuit device.

7. The method of claim 1, wherein the congestion value is based upon a number of wiring tracks available in one or more wiring channels used by the first net and the number of wiring tracks in the one or more wiring channels used by a set of nets including the first net.

8. The method of claim 1, further comprising:
    determining, by the computer, an area of interest associated with the first circuit device based upon the wirelength values of the one or more nets connected to first circuit device at the first location; and
    identifying, by the computer, the second location within the area of interest.

9. The method of claim 1, wherein each of the plurality of circuit devices includes at least one of an AND gate, an OR gate, a NOT gate, a NAND gate, a NOR gate, an XOR gate, a multiplexer, a latch, a flip-flop, and a register.

10. A system for circuit design, the system comprising:
one or more computers comprising a non-transitory machine-readable media configured to store a netlist file comprising a plurality of records of a plurality of circuit devices and a plurality of nets interconnecting the plurality of circuit devices forming an integrated circuit (IC), wherein each respective record of a circuit device or a net includes at least a location of the circuit device or the net; and
at least one computer of the one or more computers, the at least one computer coupled to the non-transitory machine readable media storing the netlist file and comprising a processor configured to:
identify a potential second location for a first circuit device at a first location, based upon one or more records of at least one of a circuit device and a net proximate to the first location as indicated by a record of the first circuit device;
determine, for a first net connected to the first circuit device at the second location, a wirelength value and a congestion value associated with the first net;
determine a cost associated with the first net based upon the wirelength value and the congestion value associated with the first net;
identify a record of a second circuit device at the second location;
determine for a second net connected to the second circuit device at the first location, a wirelength value and a congestion value associated with the second net;
determine a cost associated with the second net based upon the wirelength value and the congestion value associated with the second net;
determine a composite cost for the first circuit device at the second location based upon one or more costs associated with one or more nets including the first net connected to the first device at the second location;
determine a composite cost for the second circuit device at the first location based upon one or more costs associated with one or more nets including the second net connected to the second circuit device at the first location; and
in response to the computer determining that, for the first circuit device, the second location has a lower composite cost than the first location and, for the second circuit device, the first location has a lower composite cost than the second location:
update location information in the record of the first circuit device in the netlist file, from the first location to the second location and location information of the second circuit device, from the second location to the first location, whereby respective routing cost of at least a portion of the IC decreases responsive to updating the location information for the first and second circuit devices, and wherein the updated location information of the first and second circuit devices in the netlist file is provided to a fabrication facility for fabricating the IC.

11. The system of claim 10, wherein the computer is further configured to:
generate a graphical user interface (GUI) representing IC design based upon the netlist file, the GUI configured to display the one or more of the plurality of circuit devices and one or more of the plurality of nets according to the records of the netlist file; and
update the GUI display of the circuit devices and the nets in response to the computer updating the record of the first circuit device in the netlist file.

12. The system of claim 10, wherein the computer is further programmed to:
determine a set of one or more congestion values associated with one or more areas in the IC based upon the location of at least one of the plurality of nets; and
determine a set of one or more values indicating packing of circuit devices in the one or more areas in the IC based upon the location of at least one of the plurality of circuit devices; and
identify the first circuit device at the first location based upon at least one of the set of one or more of congestion values and the set of one or more values indicating packing of circuit devices.

13. The system of claim 10, wherein the computer is further configured to:
determine a set of one or more congestion values associated with one or more areas in the IC proximate to the first location based upon the location of at least one net in the one or more areas;
determine a set of one or more values indicating packing of circuit devices in the one or more areas based upon the location of at least one circuit device in the one or more areas; and
determine an area of interest associated with the first circuit device based upon at least one of the set of one or more congestion values and the set of one or more values indicating packing of circuit devices.

14. The system of claim 13, wherein the computer is further programmed to:
determine a second set of one or more congestion values associated with a set of one or more areas within the area of interest based upon the location of at least one net within the area of interest;
determine a second set of one or more values indicating packing of circuit devices in the set of one or more areas within the area of interest based upon the location of at least one circuit device within the area of interest; and
identify a set of one or more potential locations including the second location within the area of interest based upon at least the second set of one or more congestion values and the second set of one or more values indicating packing of circuit devices.

15. The system of claim 13, wherein the area of interest includes at least one circuit device wired to the first circuit device.

16. The system of claim 10, wherein the congestion value is based upon a number of wiring tracks available in one or more wiring channels used by the first net and the number of wiring tracks in the one or more wiring channels used by a set of nets including the first net.

17. The system of claim 10, wherein the computer is further configured to:
determining, by the computer, an area of interest associated with the first circuit device based upon the wirelength values of the one or more nets connected to first circuit device at the first location; and
identifying, by the computer, the second location within the area of interest.

18. The system of claim 10, wherein each of the plurality of circuit devices includes at least one of an AND gate, an OR gate, a NOT gate, a NAND gate, a NOR gate, an XOR gate, a multiplexer, a latch, a flip-flop, and a register.

* * * * *